FIG. 7
FIG. 8
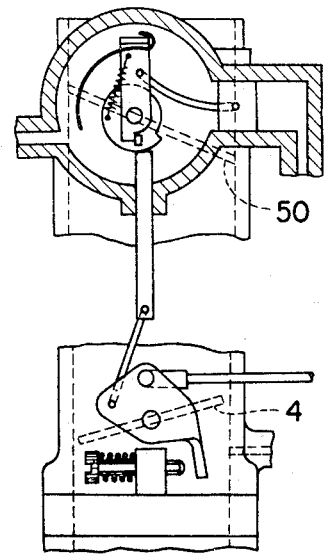
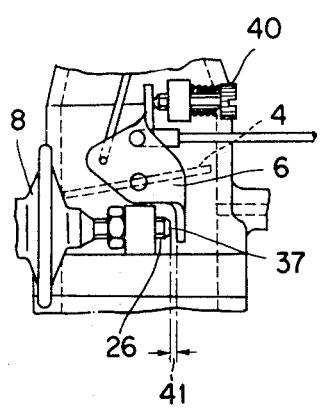

United States Patent Office 3,489,127
Patented Jan. 13, 1970

3,489,127
DEVICE FOR PREVENTING AN AUTOMOBILE ENGINE FROM STALLING
Keizo Higashigawa, Toyota-shi, Japan, assignor to Toyota Jidosha Kogyo Kabushiki Kaisha, Toyota, Japan
Filed Feb. 5, 1968, Ser. No. 702,936
Claims priority, application Japan, Feb. 15, 1967, 42/9,457
Int. Cl. F02d *11/08*
U.S. Cl. 123—103      1 Claim

ABSTRACT OF THE DISCLOSURE

A device intended for preventing an internal combustion engine equipped with a carburettor from "dying" or "stalling" during idling, and at the same time for facilitating the restarting of said engine. This device comprises pressure-response means which communicates with the air intake path downstream of the carburettor throttle valve and acts in response to the negative pressure in said path, and an adjoining shifting rod which moves to control the degree of opening the throttle valve. The shifting member is characterized by the fact that it keeps said throttle valve at a degree of opening suited to idling, by helping to open the throttle valve further as the negative pressure in said air intake path approaches atmospheric pressure.

---

The present invention relates to a device for preventing an internal combustion engine equipped with a carburettor from "dying" or "stalling" during idling, specifically to a device for automatically adjusting the carburettor throttle valve in an idling engine to a degree of opening suited to the idling state of the engine.

In a conventional internal combustion engine equipped with a carburettor, when the throttle valve is suddenly closed, the engine is likely to "die."

Analysis of the conditions leading to "dying" by an engine shows that this happens very often if the engine is shifted into an idling position when rather overheated after operation under heavy load. The reason is as follows: When the engine speed is reduced on idling, the volume of cooling air is drastically reduced and as a result the hot ambient air around the engine is apt to stagnate. On the other hand the carburettor, which has been kept at an appropriate temperature during the engine operation by the gasification heat of the fuel, becomes surrounded by said hot air and in consequence the fuel in the carburettor soon begins to boil, i.e., so-called "percolation" takes place. In addition to this, the density of the air sucked into the carburettor drops, and as the result of all these phenomena, the air/fuel ratio in the mixed gas becomes excessively rich. Moreover, the engine is more likely to "die" when the engine hood is small, so that a motor-car with too small an engine hood is likely to have its engine "die" quite frequently in summer-time.

"Dying" is not limited to the situation in which an engine has been operated under severe conditions. It may happen when a motor-car comes to a sudden stop, whereupon the engine "stalls." The reason for this is: In the air intake path extending from downstream of the carburettor throttle valve to the suction valve of a running engine, the liquid fuel adhering to the walls of said path is rapidly gasified on account of the increase in the negative pressure in said path due to the closing of the throttle valve, and is sucked into the cylinder. At the same time the fuel flowing in the fuel path of the carburettor is also sucked in large quantities into the throttle bore under inertia and, while being gasified, passes to the cylinder. In spite of this, the intake air volume to the carburettor drops as the result of the throttle valve being suddenly closed, and in consequence the air/fuel ratio in the mixed gas becomes excessively rich.

In case of a motor-car equipped with a carburettor having an automatic choke, it is often difficult to start the engine, particularly in winter-time, unless the throttle valve is opened by stepping on the accelerator pedal at least once in advance.

This is because in the conventional motor-car equipped with an automatic choke, the choke valve is so constructed that it does not close even when the automatic choke has cooled after the motor-car stops and the engine cools. The choke valve can be fully closed only when the throttle valve is opened.

Recently motor-cars have come to be equipped with an oil-pump for power steering and an air-compressor for exhaust gas purification. The latest tendency is to equip motor-cars with an AC-generator which has a high generating ability even at low speeds. Therefore in recent models of motors-cars the power consumption for engine auxiliaries has increased and even when idling with no power being transmitted to the wheels, the load on the engine itself remains heavy. When the head-lamp is switched on while the motor is idling, the load on the generator is especially increased, resulting in a drop of 100 r.p.m. in the engine speed which brings it to the brink of stalling. However, it would not be desirable to set the idling speed high enough to generate enough current to supply the headlights. Furthermore, in the case of a motor-car equipped with an automatic transmission, the resistance of the torque-converter is so large that stalling is likely to be caused whenever the engine begins to idle or the motor car is suddenly stopped. Moreover, restarting is impossible, unless the gear shift is manually returned to the neutral position. Thus, the restarting of such a motor-car is troublesome and difficult and even contributes to traffic jams and air pollution in urban areas.

Conventional means which have been used to prevent stalling whenever the engine begins to idle or upon making a sudden stop, include a dashpot which is provided for the purpose of avoiding any sudden closing of the throttle valve when the running load is cut off, but this has been found unsatisfactory, because it serves only to keep the time required to move the throttle valve from full open position to the degree of opening suitable for idling near some predetermined optimum, say 1.5 seconds, and not to guarantee any automatic, reliable operation when idling. Moreover, the resistance in the linkage between the accelerator pedal and the carburettor varies with the quality of servicing and the type of motor-car and there is also the time delay due to the dashpot to be considered. Thus considerable difficulty is encountered in adjusting and maintaining the related mechanisms so that they will act properly and make the throttle valve open to the required degree in the required time. Consequently, a motor-car equipped with such a dashpot has the drawback that the degree of opening of the throttle valve when the motor starts to idle becomes too large or too small depending on the slightest deviation from perfection in said related mechanisms so that satisfactory idling cannot be expected from such a motor-car. Finally in a motor-car with such a dashpot, when foot is removed from the accelerator pedal, thus closing the throttle valve without cutting off the running load, the effect of "engine braking" is not instantaneous, which is extremely dangerous for operation. The hazard is particularly great in the case of a motor-car equipped with an automatic transmission which has by nature a poor response to such "engine braking."

An object of the present invention, therefore, is to provide an improved device that can prevent an engine from "dying" or "stalling" when it begins to idle, or the car is suddenly stopped and which facilitates starting up again.

Another object of the present invention is to provide such an improved device which can automatically and smoothly act to initiate idling without calling for any skill of the driver and without any regard to the changing conditions of engine performance.

The third object of this invention is to provide a device which can initiate idling without causing any unreasonable loading of any engine parts.

The fourth object of this invention is to provide a device which requires very little space for the installation of its components and which can be connected to the carburettor in a compact structure.

The fifth object of this invention is to provide such a device which functions with high accuracy and increased reliability.

The sixth object of this invention is to provide an engine which exhausts less gas in starting and does not pollute the atmosphere.

The foregoing and other objects and advantages of this invention will be clearly apparent from the following description of a preferred embodiment of this invention. In this description reference is made to the accompanying drawings, in which:

FIGURE 7 shows the vital part of another embodiment of the present invention; and FIGURE 8 is a side view showing a conventional carburettor, with part of the casing broken away.

Figure 1:
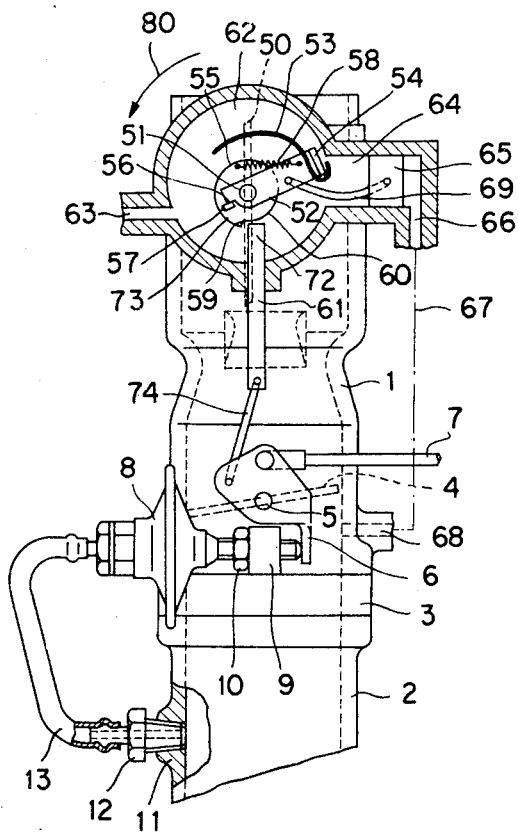
FIGURE 1 is a side view of an embodiment of the present invention with part of its casing broken.

Referring to FIG. 1, the main assembly 1 of the carburettor, which is equipped with an automatic choke is, connected through the gasket 3 to the intake manifold 2. The throttle valve 4 is mounted on the throttle shaft 5 carried by the main assembly 1. One end of said throttle shaft 5 carries a protruding arm 6, to which is linked the rod 7 which controls the opening and closing of the throttle valve 4 in response to movement of the accelerator pedal.

The negative pressure device 8 is screwed into a screw hole in the boss 9 which protrudes from the main assembly 1 of the carburettor, and after adjustment of its position relative to the arm 6, it is fixed in position by means of a lock nut 10.

The boss 11 on the side wall of the intake manifold 2 defining the air intake path, which boss is downstream of the throttle valve 4, is equipped with a union 12. Between the union 12 and the negative pressure response device 8 is a pipe 13, which connects the union 12 and said negative pressure response device 8.

Above the main assembly 1 are the choke valve 50, the choke shaft 51 which carries said choke valve, and the choke shaft arm 52 which is mounted at one end of said choke shaft.

One end of the coiled bimetallic strip 53, which serves as a thermostat, engages the end 54 of the choke shaft arm 52, while the other end of the strip 53 is fastened to the main assembly 1 by a conventional mechanism not shown. The bimetallic strip 53 normally biasses the choke valve 50 toward a closed position.

The first idling cam 55 rotatably engages the choke shaft 51, and a tension spring 58 is connected between the cam 55 and the choke shaft arm 52. This causes the cam 55 to follow the choke shaft arm 52 unless the cam 55 itself is restrained by some other object. The spring 58 is shown as a tension spring in the attached drawing, but can also be a torsion spring in practice.

The first idling cam 55 is formed with a projection 57, which contacts the stepped portion 56 of the choke shaft arm 52. Meanwhile, the first idling cam 55 has a peripheral stepped portion 59 between the cam surfaces 60, 73.

Below the first idling cam 55 is a vertically movable rod 61, the lower end of which is coupled by a link 74 to the arm 6, so the rod 61 is shifted downward as the throttle valve 4 opens and is shifted upward as the throttle valve 4 closes.

When the upper end of the rod 61 is in engagement with the lower cam surface 60 of said first idle cam 55, the throttle valve 4 is, as described later, at the position $O_2$ (FIG. 4) which is slightly opened from the full closed position, or at an even less open position. On the contrary, if the upper end of said rod 61 is in engagement with the cam surfaces 73, the throttle valve 4 comes to the position $O_4$ which is more open than the position $O_2$, or to a position just slightly less open than $O_4$.

The choke shaft arm 52, the bimetallic strip 53, and the first idling cam 55 are enclosed in the coil housing 62 which communicates with the hot air intake 63 and the vacuum cylinder 64.

The vacuum piston 65 is mounted in the cylinder 64 and the motion of its vacuum piston 65 is transmitted to the choke shaft arm 52 by the connecting rod 69 which is connected to the piston 65. The hot air outlet 66, on the other side of said vacuum piston 65, is connected via the path 67 to the suction outlet 68 of the air intake path downstream of the throttle valve 4.

Figure 2:
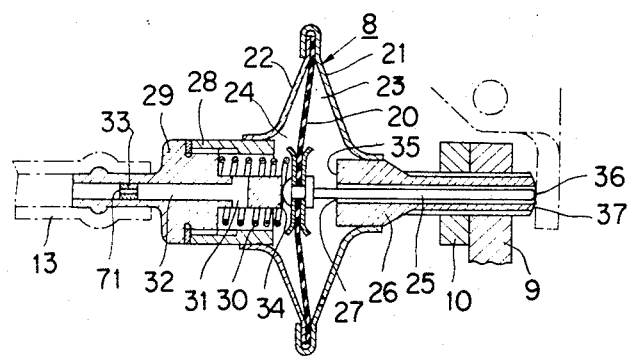
FIGURE 2 and FIGURE 3 are axial sectional views showing at different operative positions and on an enlarged scale, the negative pressure response device to be employed in this invention.
Figure 3:
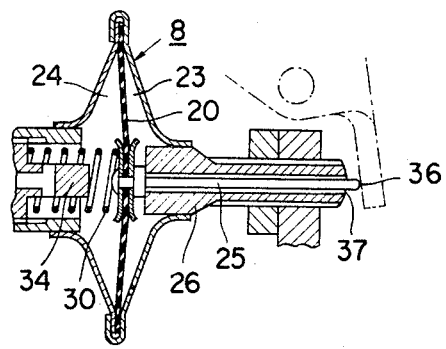

Referring to FIGS. 2 and 3 showing enlarged sections of the negative pressure response device 8 at different positions, the edges of the diaphragm 20 are stretched between two casing halves 21, 22. The diaphragm divides the casing into an atmospheric chamber 23 and a vacuum chamber 24 adjoining each other. The casing half 21 on the side of the atmospheric chamber 23 is equipped with a guide cylinder 26; and the male screw provided on the periphery of said guide cylinder 26 is, as described above, fitted into the screw hole in the boss 9 and immobilized by a lock nut 10.

At the center of the diaphragm 20 is a shifting rod 25, which passes through the atmospheric chamber 23 and extends into a bore 27 in the guide cylinder 26. A slight clearance is left between the outer surface of said shifting rod 25 and the inside surface of said bore 27, so that the shifting rod 25 may slide freely within the bore 27 in the guide cylinder 26. Displacement of the shifting rod 25 to the left is limited by the inner end 34 of a cap 29 which will be described later, while displacement of the rod 25 to the right is limited by the inner end 35 of the guide cylinder 26. When said shifting rod 25 is shifted to the left and strikes the inner end 34 of said cap 29, the tip 36 of the rod 25 is flush with the outer end face 37 of said guide cylinder 26, as shown in FIG. 2, or may assume a position slightly withdrawn from said outer end face 37. If, on the contrary, the rod 25 is shifted to the right and strikes the inner end face 35 of the guide cylinder 26, the tip 36 of the rod 25 will, as indicated in FIG. 3, project beyond the outer end 37 of the guide cylinder 26.

The casing half 22 on the side of the vacuum chamber 24 is hermetically sealed to a mouthpiece 28, into which the cap 29 is screwed and likewise hermetically sealed. Between the cap 29 and the diaphragm 20 is a compression spring 30. The cap 29 is provided with a transverse hole 31 and an axial hole 32 at right angles to said hole 31. These two holes connect the vacuum chamber 24 via the pipe 13 to the air intake path downstream of the throttle valve 4. A throttle 33 having an orifice 71 is force-fitted in the hole 32.

Figure 4:
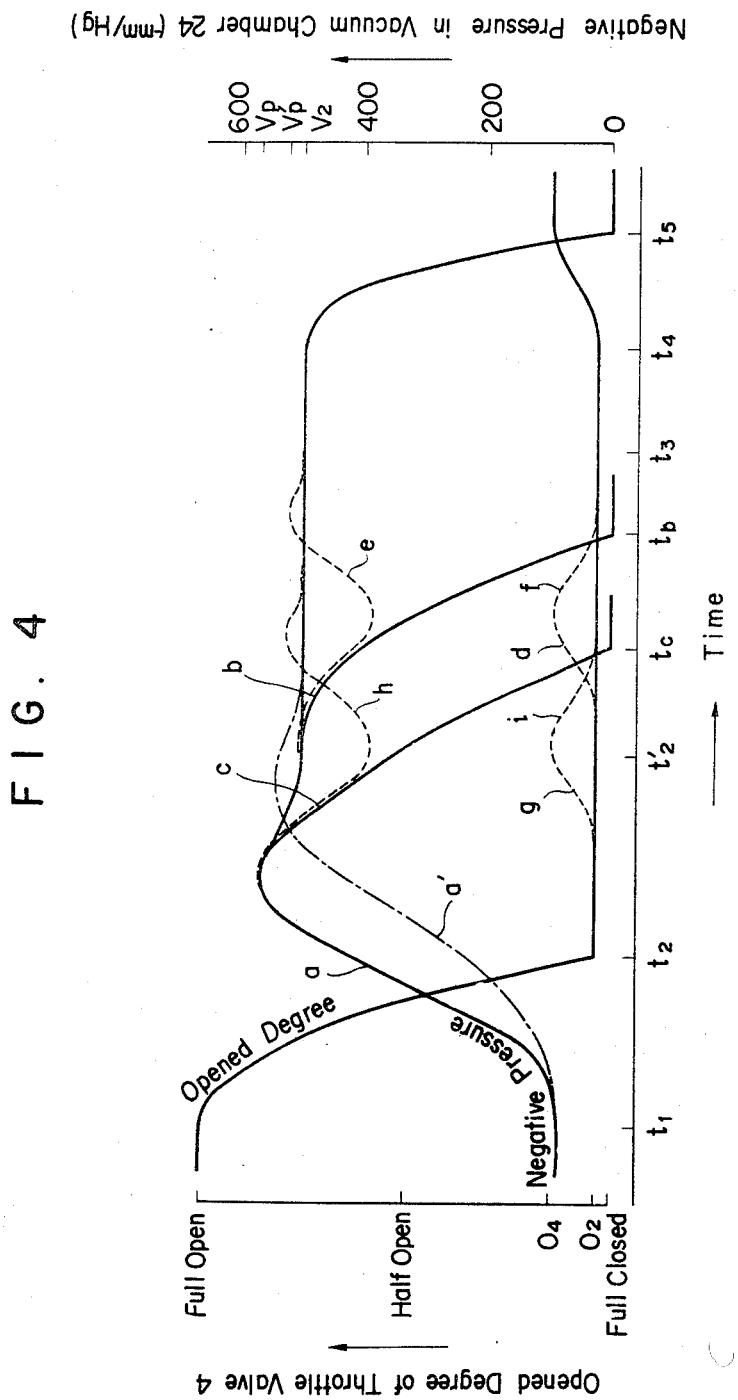
FIGURE 4 is a graph showing the relationship between the degree of opening of the throttle valve and the negative pressure in the vacuum chamber.

The measured results of the relationship between the degree of opening of the throttle valve 4 and the negative pressure in the vacuum chamber 24 in an internal combustion engine are illustrated in FIG. 4. Referring to this figure, when the clutch is released and at the same time the force which keeps the throttle valve fully open is reduced in order to discontinue full load operation of the engine with its throttle valve fully open, at time $t_1$, the throttle valve 4 will be rapidly closed by a back spring (not shown) and at time $t_2$ the valve 4 will assume a slightly open position $O_2$ which is necessary to keep the engine idling and that position $O_2$ will be maintained until the operating conditions change. (For the sake of simplifying the explanation, the effect of the throttle 33 (FIG. 2) in the negative pressure response device 8 is being ignored.) When the throttle valve 4 comes to the position $O_2$, the negative pressure in the air intake path and in the vacuum chamber 24 will increase following the curve $a$ in FIG. 4 and then settle down to the normal idling negative pressure $V_2$ at time $t_{2'}$ which is slightly later than $t_2$.

The peak $V_p$ appearing before the negative pressure settles down to the value $V_2$ is the result of a negative loading phenomenon due to the fact that the engine revolution speed fails to drop rapidly, following the sudden closure of the throttle valve 4, when the foot is removed from the accelerator pedal.

When an engine "stalls," the revolution speed, instead of following the above-mentioned curve drops immediately after seeming to settle to the negative pressure $V_2$ or following the peak $V_p$; and the negative pressure falls in the curve $b$ or $c$ and ultimately at time $t_b$ or $t_c$ the engine comes to a stop.

According to the present invention, the following process takes place. Namely, during full open operation of throttle valve 4 the negative pressure in the air intake path is close to the atmospheric pressure, and accordingly the negative pressure in the vacuum chamber 24 of the negative pressure response device 8 is close to the atmospheric pressure in the atmospheric chamber 23. Under these conditions, the diaphragm 20 and the shifting rod 25 are, as indicated in FIG. 3, moved by the compression spring 30 toward the atmospheric chamber 23 to the full limit of their stroke, and the tip 36 of the shifting rod 25 occupies a position in which it protrudes slightly beyond the outer end 37 of the guide cylinder 26. At this instant, since the throttle valve 4 is fully open, the arm 6 is well away from the tip 36 and is not prevented from extending beyond the tip 36.

After time $t_1$ when the fully open operation of the throttle valve 4 is discontinued, the negative pressure in the vacuum chamber 24 will rise, as mentioned earlier, following the curve $a$ up to $t_2$ and come to settle at $t_{2'}$. With an increase in the negative pressure in the vacuum chamber 24, the atmospheric pressure in the atmospheric chamber 23 will, overcoming the force of the compression spring 30, push the diaphragm 20 toward the vacuum chamber 24, and at the same time the shifting rod 25 will move to the left, its tip 36 being slightly withdrawn from the outer end 37 of the guide cylinder 26 and assume the position shown in FIG. 2. Thereupon, the arm 6 comes into contact with the outer end 37 of the guide cylinder 26 and the throttle valve 4 is held at the position $O_2$.

If idling is discontinued and the revolution speed continuously continues to fall even after the time $t_{2''}$, the negative pressure in the vacuum chamber 24 also falls, following the curve $b$, and approaches atmospheric pressure, whereupon the shifting rod 25 is moved by the compression spring 30 to the right. Its tip 36 then extends beyond the outer end 37 of the guide cylinder 26, thereby pushing the arm 6, slightly opening the throttle valve 4 as indicated by the curve $d$, and increasing the engine's revolution speed. As a consequence of this increase in the engine revolution speed, the negative pressure in the vacuum chamber 24 will rise, following the curve $e$, and the tip 36 of the shifting rod 25 will be withdrawn from the outer end 37 of the guide cylinder 26, thereby causing the throttle valve 4 to reduce its degree of opening, following the curve $f$.

If during the process the engine settles to such thermal and mechanical conditions as are favorable to the maintenance of idling, there will be only one hunting and this, too, will vanish at $t_3$. If such conditions are not attained and the hunting continues, a steady condition will be reached after the projection of the tip 36 of the shifting rod 25 has been repeated several times. A minor peak $V_{p'}$ which appears before settling represents the same phenomenon due to the application of an engine brake as in the case of the above-mentioned peak $V_p$. Similar hunting will also happen when the revolution speed drops after the peak $V_p$; the first hunting in this case takes place following the curves $c$, $g$, $h$, $i$.

Moreover, when during idling, the engine load is increased by, for example, the lighting of the headlights, the revolution speed of the engine will correspondingly drop, causing a drop in the negative pressure in the vacuum chamber 24, and, by an amount corresponding to this drop of negative pressure, the shifting member 25 will be moved to the right, thereby opening the throttle valve 4 further. As a result the engine will speed up until it attains the revolution speed at which it was operating prior to the increase of load. Thus, it can continue to idle. In this case the negative pressure settles to a value slightly lower than the above-mentioned $V_2$ and the throttle valve 4 is slightly more open than when at the above-mentioned position $O_2$.

The foregoing explanation is made without considering the throttle 33 force-fitted into the hole 32 in the cap 29 in the negative pressure response device 8. Since the function of the throttle 33 is to transmit the reduced variation in the negative pressure in the air intake path to the vacuum chamber 24, in the above explanation the negative pressure change in the vacuum chamber 24 in FIG. 4 has no time delay as compared with that in the air intake path, where as, when the throttle 33 with an orifice 71 is force-fitted into the hole 32, the curve representing the increase in the negative pressure of the vacuum chamber 24 to begin at $t_1$ will be less steep than the one representing the negative pressure of the air intake path, and will follow the line $a'$, thus delaying the peak time at which it reaches its maximum value and that at which it finally settles down.

This delay in reaching the peak time reduces the height of the peak and makes the hunting period longer and its amplitude less. Therefore, the shift to idling and the continued idling can take place smoothly. The size of the orifice 71 and the characteristics of the negative pressure response device 8 depend on the characteristics of the carburetor and the engine.

In FIG. 4, $t_4$ is the moment at which the ignition circuit is opened to stop the engine and $t_5$ is the moment at which the engine comes to a halt. With a decrease in the r.p.m. of the engine, the negative pressure in the vacuum chamber 24 falls, reaching atmospheric pressure at $t_5$, and the shifting rod 25 of the negative pressure response device 8 is extended to the full limit of its stroke, thereby exerting preessure against the arm 6 and holding the throttle valve 4 at the position $O_4$.

Figure 5:
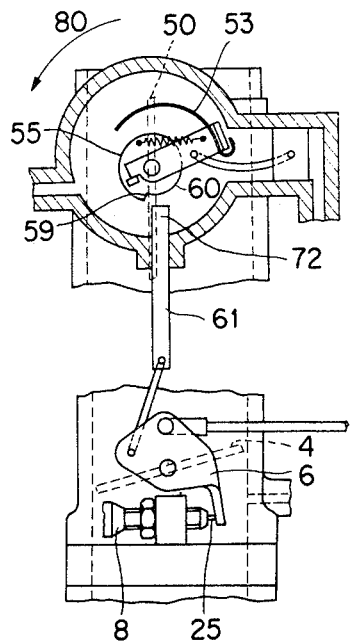
FIGURE 5 is a side view of the device of FIG. 1 at stop.

FIGURE 5 shows the device according to this invention in the position which it occupies at time $t_5$.

FIGURE 1 shows a warmed-up engine idling in a normal manner. In a conventional engine without the negative pressure response device 8, when the ignition circuit is opened and the engine stops, the bimetallic strip 53 also cools as the engine cools, and as a result, the force in the direction of arrow 80 acting to close the choke valve 50 increases. Meanwhile, the stepped portion 56 of the choke shaft arm 52 which is engaged by one end of the bimetallic strip 53 is in contact with the projection 57 on the first idling cam 55, and the stepped portion 59 in the peripheral surface of the first idling cam 55 is in contact with the top end 72 of the rod 61. Therefore, the choke valve 50 will not be able to assume its fully closed position, but is kept at its fully open position or in a nearly open position.

In the present invention, the engine, when halted, assumes the condition illustrated in FIG. 5 as described above, that is, the upper end 72 of the rod 61 comes to a position spaced from the cam surface 60 of the first idling cam 55. As the distance separating said upper end 72 from the cam surface 60 is greater than the height of the stepped portion 59, the first idling cam 55 is free to turn in the direction of arrow 80 unhindered by the upper end 72 of the rod 61. Accordingly, the choke valve 50 will begin to close in the direction of arrow 80, being drawn in that direction by the bimetallic strip 53 as it cools. When the choke valve 50 closes fully, the device is ready for the next starting, as in FIG. 6.

Figure 6:
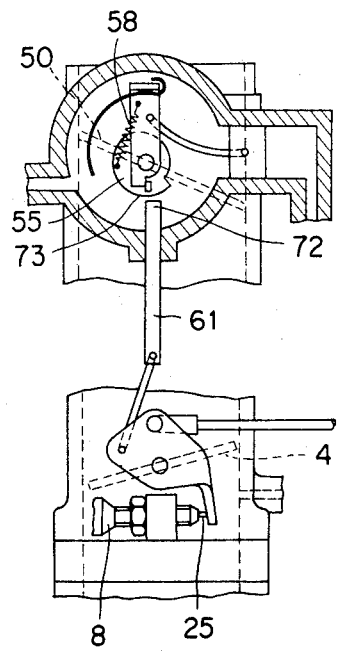
FIGURE 6 shows a side view of the device of FIG. 1 in cooled condition.

To explain the manner in which a cold engine is started, referring to FIG. 6, when the engine is successfully started, with its revolution speed increasing and the negative pressure in the vacuum chamber 24 (FIG. 2) of the negative pressure response device 8 rising to a certain extent, the shifting rod 25 is withdrawn, the rod 61 moves upward and its upper end 72 engages the cam surface 73. The throttle valve is therefore in a slightly less open position than the position $O_4$, but this degree of opening is enough to overcome a heavy resistance to turning over and continue the idling and facilitate the warming up of the engine. If at this stage the engine comes close to stalling, as described above, the negative pressure response device 8 acts to open the throttle valve 4 to the position $O_4$, thereby averting such stalling.

When the engine is sufficiently warmed up, its resistance to turning over is reduced, the choke valve 50 is fully opened and a considerably higher speed of about 3,000 r.p.m. is attained. If, in this state, the accelerator pedal is stepped on once, the rod 61 will drop, separating its upper end 72 from the cam surface 73, and the tension spring 58 will turn the first idling cam 55, bringing it into the fully open position of FIG. 1 and at the same time closing the throttle valve 4 to the position $O_2$. Then, with the engine completely warmed up, the engine will idle normally.

In the illustrated embodiment of this invention, only one stepped portion 59 is provided on the cam surface, but even when there are more than two such stepped portions or when the cam has no step and is formed with a single spiral curved surface, approximately the same effect as described above can be achieved.

FIGURES 1, 5 and 6 illustrate the case in which the negative pressure response device 8 also serves as the throttle adjusting means. When the negative pressure response device 8 is coupled to a throttle adjusting screw, as shown in FIG. 7, the throttle adjusting screw 40 has to be turned to adjust the opening of the throttle valve 4 to its slightly open position $O_2$, while the negative pressure response device 8 has to be so set as to allow a slight gap 41 between the outer end 37 of the guide cylinder 26 and the arm 6 in the FIG. 2 position, that is, when the shifting rod 25 is withdrawn to the maximum limit.

In the cases of FIGS. 1, 5 and 6, the outer end 37 of the guide cylinder 26 restricts the degree of opening of the throttle valve 4 to the position $O_2$. The case of FIG. 7, the tip of the throttle adjusting screw 40 regulates the position of the arm 6 so as to set the throttle valve 4 to the position $O_2$.

Whereas in the dashpot provided in the conventional device a compression spring which is flexible and difficult to handle is employed as the restricting member, in the present invention a rigid, reliable means is provided as the restricting member.

For the purpose of preventing the engine from failing to maintain its idling speed and stalling when the engine reverts to idling after operation under a heavy load likely to cause overheating of the engine or, when the motor-car comes to a sudden stop, in the conventional device the throttle adjusting screw is turned so that its idling speed is always kept higher than the normal revolution speed of 600–800 r.p.m., or the idling state is carefully watched so that the throttle valve can be opened every time the engine came close to stalling, or the idling state is gradually resumed by running the engine at a medium speed for some time even after the clutch is released.

To keep the revolution speed during idling at a high level, as described above, requires skillful clutch connection in shifting to operation under load and at the same time causes substantial wearing of the friction plate of the clutch. Opening of the throttle valve just before stalling of the engine or keeping the engine running at a medium speed even after releasing the clutch is likely to damage the engine. All of these conventional practices wastefully consume fuel, generate a loud noise and inflict a mental strain on the driver.

Furthermore, in the case of a motor-car equipped with an AC generator which imposes a heavy load on the engine in the low speed range, the revolution speed under idling is lower than the daytime speed by an increment of load due to the lighting of the headlights when the motor-car stops at night for a time at an intersection and this makes the engine more likely to stall. To counteract this, the above-mentioned steps have been taken or the headlights were switched off at every stop, or an expensive automatic device for switching off the headlights has been provided.

According to the present invention, when the engine is about to stall and the negative pressure in the air intake path falls close to atmospheric pressure, the shifting rod 25 of the negative pressure response device 8 opens the throttle valve 4, so that stalling may be averted and idling continued even after the above-mentioned operation, under heavy load, or when the car is stopped very abruptly.

It will sometimes be necessary to start operating the engine under load before the engine has been fully warmed up, and stalling of the engine in mid-idling in such cases is most undesirable. According to this invention, stalling of the engine even under these conditions can be reliably avoided.

A motor-car equipped with an automatic transmission has been likely to stall even while being warmed up, but the present invention will eliminate this possibility.

A motor-car equipped with a dashpot has also been found unsatisfactory, because it has a slow response when the force used to step on the accelerator pedal was reduced or completely eliminated during "engine braking," with the foot off the pedal. The braking effect was weak if the throttle valve was opened too wide when the foot was removed from the pedal while the braking effect was so excessive that it posed a danger if the throttle valve was not opened widely enough. When the device of this invention is adopted, "engine braking" can be used as desired and there is no uncertainty inherent in an engine with a dashpot.

In a conventional carburettor not equipped with any negative pressure response device 8 as shown in FIG. 8, for starting the engine, the throttle valve 4 cannot be held at the position $O_4$, which is more favorable for starting than the position $O_2$, while the engine is at rest. This has made it impossible to close the choke valve 50 and, for starting the engine it was necessary to restore the throttle valve 4 and the choke valve 50 into an appropriate condition as indicated by FIG. 8 by stepping on the accelerator pedal at least once before closing the ignition circuit. When the accelerator pedal was inadvertently stepped on two or three times in succession, this involved a great likelihood that the liquid fuel injected into the throttle bore from the fuel acceleration system of the carburettor would wet the points of the spark plugs and result in a failure to ignite due to "flooding."

By contrast, in this invention, when, as described above, the engine is stopped and cooled, the choke valve 50 is closed and the throttle valve 4 is kept open at the position $O_4$. Therefore, the starter key has only to be turned to insure smooth starting of the engine. Meanwhile, the fact that the throttle valve 4, when the engine is started, is held at the position $O_4$ which is more open than the position $O_2$, which is necessary for maintaining the idling state, further assists in starting the engine, because the air intake and compression are increased, making the mixed gas easier to burn.

With the choke valve fully open, as when the warm-up has been finished, or even when said valve is half open as in midwarm-up, or when starting in spring or autumn, the position $O_4$ of the throttle valve 4 would, for the above reasons, be more advantageous than the position $O_2$.

Moreover, since in the process of the engine cooling and automatic choke mechanism cooling, the choke valve 50 is not locked in a fully open or a nearly open position, the bimetallic strip 53 will not be forced to undergo excessive deformation at low temperatures nor will it develop any excessive stress or permanent strain. Consequently the strip 53 can keep functioning in a reliable manner.

In the above embodiment of this invention, a negative pressure response device 8 having a diaphragm 20 is illustrated and described. Since, however, the force of back spring so mounted on the arm 6 or the rod 7 as to close the throttle valve 4 is approximately proportional to the degree of opening of the throttle valve 4, the negative pressure response device 8 has only to generate a force which is enough to exert a slight pressure on the arm 6 of the throttle valve 4 slightly and accordingly the force generated by said device 8 need not be large. Thus, it would be possible to use a plunger and a cylinder instead of the diaphragm 20 and the casing halves 21, 22, thereby rendering the device 8 more compact.

The negative pressure response device 8 may be mounted on the intake manifold instead of the carburettor, and a throttle bore downstream of the throttle valve 4 may be utilized instead of the intake manifold. If, more practically, the negative pressure is detected at the throttle bore downstream of the throttle valve and the negative pressure response device is mounted on the main assembly of the carburettor so that it can concurrently perform the function of a throttle adjusting screw, the automatic stop prevention device for an internal combustion engine with a carburettor in accordance with this invention will be more advantageous, because it can then be correlated with the carburettor.

The present invention which prevents stalling of the engine and facilitates its starting provides an engine which causes less air pollution because it does not have to be started and restarted so often, thus exhausting a great deal of obnoxious gas. Thus, by eliminating the possibility of stalling and a subsequent restarting of engine necessitated thereby, this invention makes a valuable contribution not only to the abatement of air pollution but also, in the case of motor-cars, to the prevention of traffic jams due to stalling engines.

What is claimed is:

1. A pressure-responsive device for preventing the stalling of an internal combustion engine equipped with a carburettor provided with a throttle valve, said device comprising a vacuum chamber which communicates with the air intake path for the engine downstream of said throttle valve, an atmospheric chamber which communicates with the atmosphere, a diaphragm which separates said vacuum chamber and said atmospheric chamber, a cylinder fixed to said atmospheric chamber and a piston having one end fixed to said diaphragm, said piston being slidable in said cylinder between a position in which the other end of said piston projects beyond the outer end of said cylinder and a position in which said other end of said piston is withdrawn within the outer end of said cylinder in dependence on the pressure difference between said chambers, and an arm which is displaced by movement of said piston, which contacts the end of said cylinder when said other end of said piston is withdrawn within the outer end of said cylinder, and which controls the degree of opening of said throttle valve, said arm being connected to maintain said throttle valve at an open position suitable for idling of the engine and to aid in opening said throttle valve further when the negative pressure in said air intake path approaches atmospheric pressure, thus causing said piston to project from said cylinder.

References Cited

UNITED STATES PATENTS

| | | | |
|---|---|---|---|
| 2,499,607 | 3/1950 | Read | 123—119 XR |
| 2,747,848 | 5/1956 | Kehoe | 123—103 XR |
| 2,782,025 | 2/1957 | Olson. | |

LAURENCE M. GOODRIDGE, Primary Examiner